US010307019B2

(12) United States Patent
Yurkovetskaya et al.

(10) Patent No.: US 10,307,019 B2
(45) Date of Patent: *Jun. 4, 2019

(54) SHAKER BOTTLE WITH MAGNETIC ELEMENTS FOR TEMPORARY SECUREMENT TO EXERCISE EQUIPMENT

(71) Applicants: Hanna Yurkovetskaya, Staten Island, NY (US); Joseph Campolo, Staten Island, NY (US)

(72) Inventors: Hanna Yurkovetskaya, Staten Island, NY (US); Joseph Campolo, Staten Island, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/136,861

(22) Filed: Sep. 20, 2018

(65) Prior Publication Data
US 2019/0014949 A1   Jan. 17, 2019

Related U.S. Application Data

(63) Continuation of application No. 15/046,164, filed on Feb. 17, 2016, now Pat. No. 10,105,012.

(60) Provisional application No. 62/117,100, filed on Feb. 17, 2015.

(51) Int. Cl.
| | |
|---|---|
| *B65D 43/00* | (2006.01) |
| *A47J 43/27* | (2006.01) |
| *B65D 43/02* | (2006.01) |
| *A47J 45/02* | (2006.01) |

(52) U.S. Cl.
CPC .............. *A47J 43/27* (2013.01); *A47J 45/02* (2013.01); *B65D 43/0231* (2013.01); *B65D 2313/04* (2013.01); *B65D 2543/00046* (2013.01); *B65D 2543/00092* (2013.01); *B65D 2543/00296* (2013.01); *B65D 2543/00351* (2013.01); *B65D 2543/00518* (2013.01); *B65D 2543/00537* (2013.01); *B65D 2543/00555* (2013.01)

(58) Field of Classification Search
CPC ........... B65D 2543/00296; B65D 2543/00555; B65D 2543/00537; B65D 2543/00518; B65D 2543/00351; B65D 2543/00092; B65D 2543/00046; B65D 2313/04; B65D 43/0231; A47J 45/02; A47J 43/27
USPC ......................................................... 215/395
See application file for complete search history.

(56) References Cited

U.S. PATENT DOCUMENTS

| | | | | |
|---|---|---|---|---|
| 3,254,804 A | * | 6/1966 | Grant ................ | A47L 11/161 15/50.1 |
| 3,556,341 A | * | 1/1971 | Forrest .............. | A47G 19/2272 206/818 |
| 3,713,614 A | * | 1/1973 | Taylor ................ | F21L 4/005 248/205.3 |
| 3,820,692 A | * | 6/1974 | Swett et al. ....... | B65D 47/0895 222/547 |
| 4,700,436 A | * | 10/1987 | Morita .............. | A45C 13/1069 24/303 |
| D311,659 S | * | 10/1990 | Storsberg ........... | D7/384 |

(Continued)

*Primary Examiner* — Ernesto A Grano
(74) *Attorney, Agent, or Firm* — Amster, Rothstein & Ebenstein LLP

(57) ABSTRACT

A protein shaker bottle or similar beverage container that has one or more magnets on its outer surface. The magnets allow for the shaker bottle to magnetically adhere to a metallic or ferrous surface. The inventive bottle allows a user to quickly and temporarily adhere the bottle to a piece of gym equipment on a gym floor.

14 Claims, 5 Drawing Sheets

(56) References Cited

U.S. PATENT DOCUMENTS

| | | | | |
|---|---|---|---|---|
| 5,405,004 A * | 4/1995 | Vest | B25H 3/06 206/350 |
| D382,968 S * | 8/1997 | Giles | D24/197 |
| 5,996,821 A * | 12/1999 | Farber | G09F 7/04 211/45 |
| 6,065,632 A * | 5/2000 | Moore, Jr. | A45F 3/16 206/818 |
| D429,967 S * | 8/2000 | Barfield | D7/620 |
| 6,193,202 B1 * | 2/2001 | Rogers | A47C 7/68 248/106 |
| 6,237,767 B1 * | 5/2001 | Lee | B25H 3/023 206/234 |
| 6,305,656 B1 * | 10/2001 | Wemyss | A47G 23/0216 206/5 |
| 6,409,374 B1 * | 6/2002 | Willat | A47G 19/2205 206/520 |
| 6,491,271 B1 * | 12/2002 | Adams | A47G 1/17 248/206.5 |
| 6,520,367 B1 * | 2/2003 | Piroch | A47F 1/06 220/4.21 |
| 6,643,845 B2 * | 11/2003 | O'Dea | A41D 19/01594 2/160 |
| D510,235 S * | 10/2005 | Sorensen | D7/510 |
| D565,353 S * | 4/2008 | Roth | D7/510 |
| D573,839 S * | 7/2008 | Sun | D7/510 |
| D597,365 S * | 8/2009 | Oas | D7/300.1 |
| 7,789,229 B2 * | 9/2010 | Frakes | B25H 3/02 206/350 |
| D642,437 S * | 8/2011 | Schofield | D24/197 |
| 8,001,671 B2 * | 8/2011 | Mitchell | A47G 23/0225 220/737 |
| D656,357 S * | 3/2012 | Enghard | D7/300.1 |
| 8,613,369 B2 * | 12/2013 | Kitto | B65D 55/16 215/390 |
| 8,695,830 B2 * | 4/2014 | Meyers | B65D 51/242 220/254.3 |
| D717,601 S * | 11/2014 | Dixon | D7/510 |
| 8,939,305 B2 * | 1/2015 | Meyers | B65D 47/0885 220/262 |
| D723,332 S * | 3/2015 | Steel | D7/510 |
| D746,619 S * | 1/2016 | Aller | A01G 9/022 D6/677 |
| D751,344 S * | 3/2016 | Charlton | D7/300.1 |
| D752,390 S * | 3/2016 | Ksiazek | D7/300.1 |
| D754,483 S * | 4/2016 | Elsaden | D7/531 |
| D760,541 S * | 7/2016 | Kane | D7/510 |
| D766,029 S * | 9/2016 | Lin | D7/300.1 |
| 9,492,024 B2 * | 11/2016 | Sorensen | A47G 19/2205 |
| 2003/0047578 A1 * | 3/2003 | Barnett | A45F 3/18 224/562 |
| 2004/0021049 A1 * | 2/2004 | Payne | B60N 3/103 248/310 |
| 2004/0084593 A1 * | 5/2004 | Barfield | A47G 23/0225 248/311.2 |
| 2004/0104320 A1 * | 6/2004 | Exler | A47G 23/0225 248/206.5 |
| 2004/0178244 A1 * | 9/2004 | Houtte | B62J 11/00 224/414 |
| 2005/0056655 A1 * | 3/2005 | Gary | A47G 19/2261 220/737 |
| 2005/0169693 A1 * | 8/2005 | Serio | B05C 17/0357 401/219 |
| 2006/0037902 A1 * | 2/2006 | Pedersen | C02F 1/482 210/222 |
| 2006/0124526 A1 * | 6/2006 | Flick | C02F 1/481 210/222 |
| 2006/0201956 A1 * | 9/2006 | Romo | B65D 81/3879 220/737 |
| 2009/0166368 A1 * | 7/2009 | Regan | B65D 25/34 220/739 |
| 2010/0108703 A1 * | 5/2010 | French | B65D 23/001 220/737 |
| 2011/0155750 A1 * | 6/2011 | Bernstein | A45F 3/16 220/714 |
| 2012/0280096 A1 * | 11/2012 | Goldman | B60N 3/101 248/224.8 |

\* cited by examiner

SHAKER BOTTLE WITH MAGNETIC ELEMENTS FOR TEMPORARY SECUREMENT TO EXERCISE EQUIPMENT

RELATED APPLICATIONS

This application is a continuation of and claims priority to and the benefit of U.S. application Ser. No. 15/046,164, filed Feb. 17, 2016 and entitled SHAKER BOTTLE WITH MAGNETIC ELEMENTS FOR TEMPORARY SECUREMENT TO EXERCISE EQUIPMENT, which in turn claims priority to and the benefit of U.S. Prov. Appl. Ser. No. 62/117,100, filed on Feb. 17, 2015, and the contents of these applications are incorporated herein by reference in their entirety.

FIELD OF THE INVENTION

The invention relates to the field of beverage containers, more specifically to a protein shaker bottle having a magnets on it body allowing for temporary securement to exercise equipment.

BACKGROUND FOR THE INVENTION

Protein shaker bottles or blender bottles have gained widespread use in gyms, fitness clubs and similar venues. Many gym goers carry their shaker bottles on the gym floor so that they may readily consume a protein-rich beverage during or after a workout session. Shaker bottles are typically quite large, often cumbersome and it can be a nuisance to temporarily place them down while working on a particular exercise machine or similar equipment.

There is, therefore, a need in the art for a shaker bottle that is configured for easy temporary storage in various areas of a gym floor.

SUMMARY OF THE INVENTION

The invention forth herein is a shaker bottle that has one or more magnets on its outer surface—thereby allowing for a temporary magnetic attachment to a piece of gym equipment. A user, thus, need only temporarily attach the shaker to a piece of gym equipment, allowing for fast and convenient stowage of the same.

DETAILED DESCRIPTION OF TILE INVENTION

Embodiments of the present invention will now be described with reference to the FIGS. 1-5. However, the drawings and the description herein of the invention are not intended to limit the scope of the invention. It will be understood that various modifications of the present description of the invention are possible without departing from the spirit of the invention. Also, features or steps described herein may be omitted, additional steps or features may be included, and/or features or steps described herein may be combined in a manner different from the specific combinations recited herein without departing from the spirit of the invention, all as understood by those of skill in the art.

Figure 1:
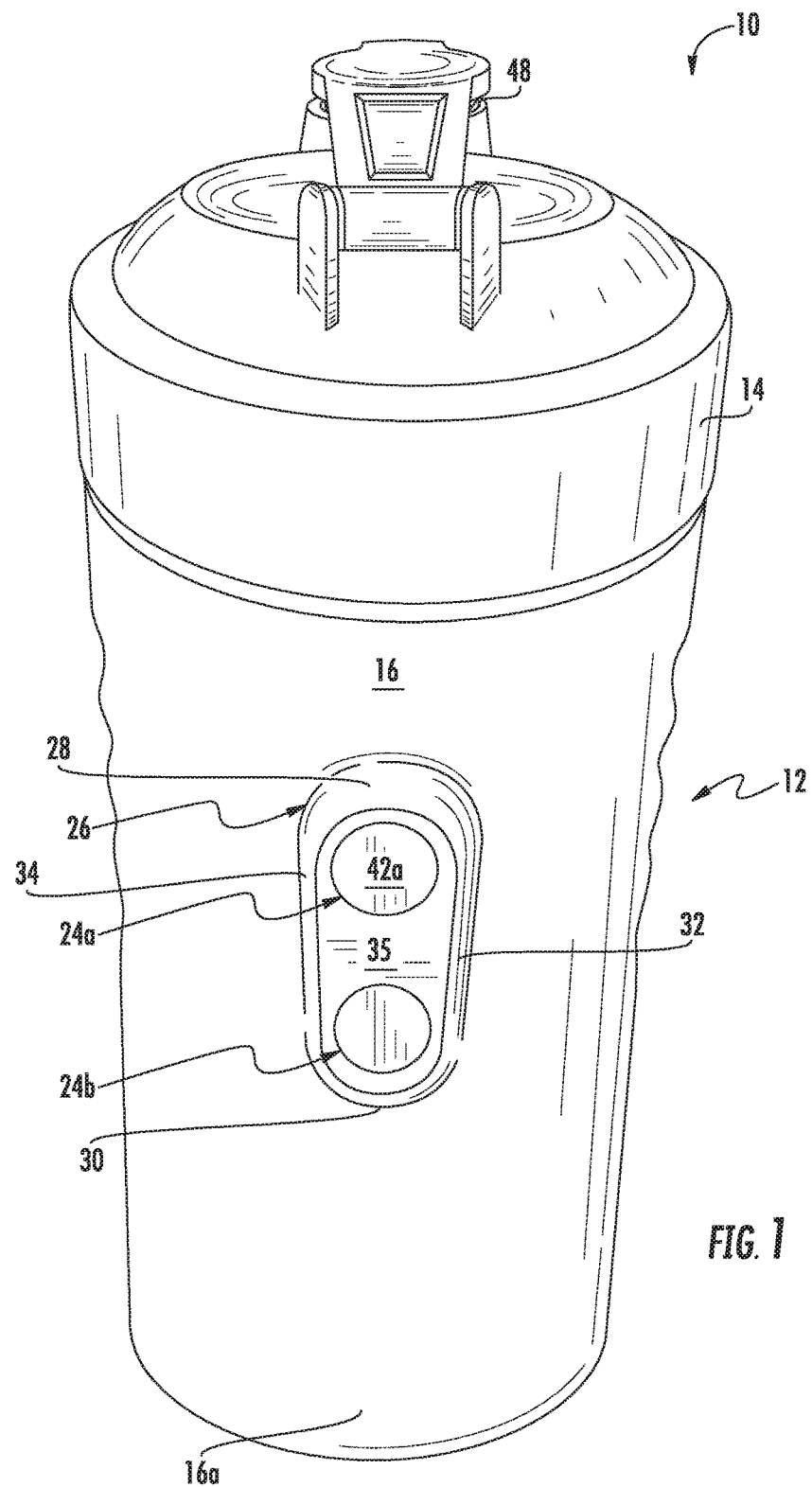
FIG. 1 is a rear, perspective view of a shaker bottle according to an embodiment of the invention.
Figure 3:
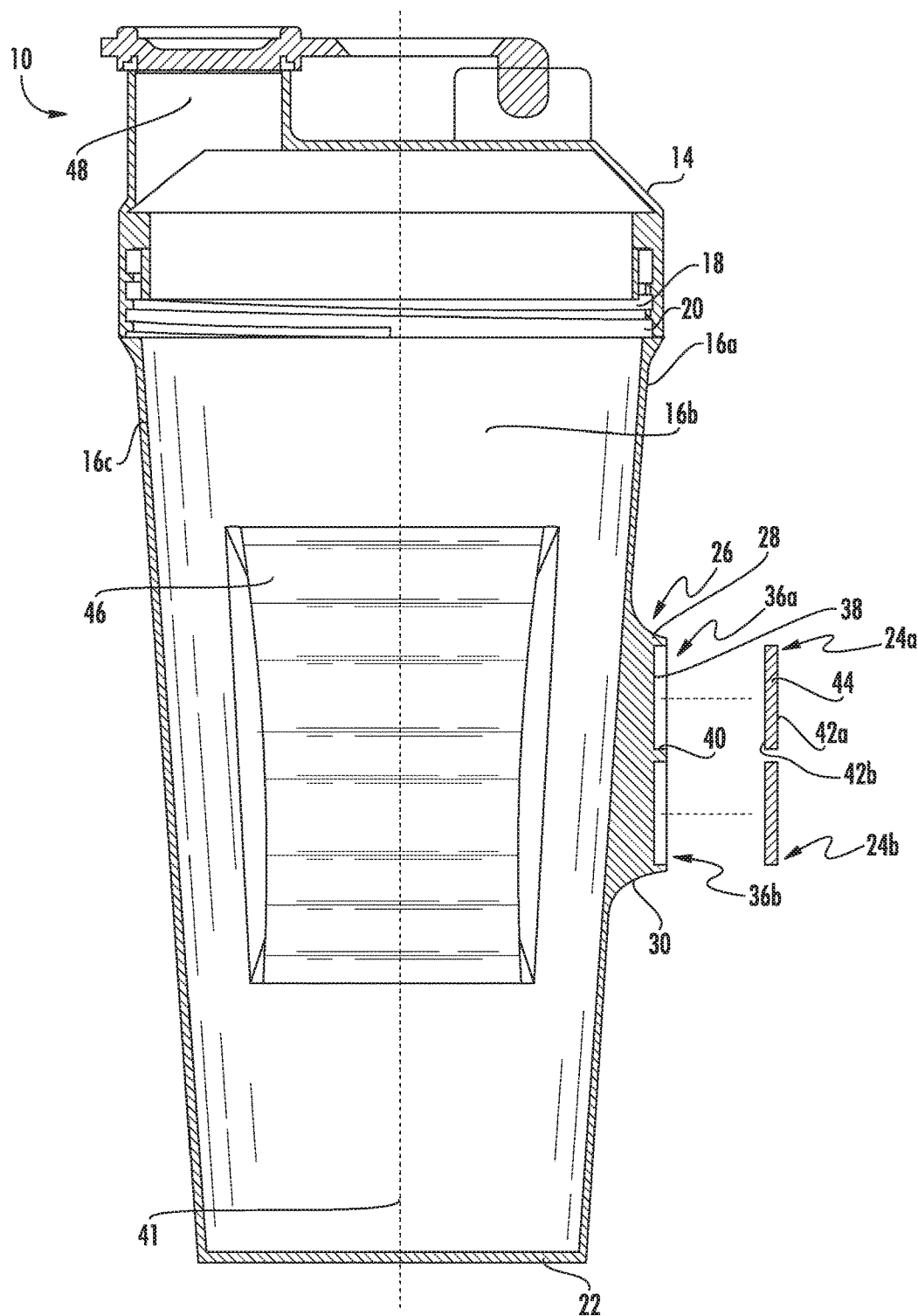
FIG. 3 is a side, cross-sectional view taken along the plane denoted by line 29 of FIG. 2.

FIG. 1 shows a shaker bottle according to an embodiment of the invention. The shaker bottle 10 is substantially sized and shaped like a conventional shaker bottle, having a generally cylindrical container 12 and a top cover member 14. Container 12 which is the well portion of the bottle has an interior cavity for holding beverages or other fluids and an outer surface 16. As best shown in FIG. 3, mating threads 18 provided on upper lip 20 of container 12 mate with corresponding threads on cover 14 in order to selectively attach cover 14 to container 12.

As best shown in FIG. 3, in an embodiment of the invention, cylindrical container 12 has a tapered or inclined external surface 16. That is, upper lip 20 of container 12 has a greater circumference than that of bottom surface 22 of container 12. As such, the outer panels of shaker 10 slope inwardly as they descend from lip 20 to floor surface 22. ("Bottom surface" or "floor surface" refer to the bottom plate or surface of container 12, which has an inner and outer surface. The inner surface serves as the bottom of the cup interior and the outer surface rests on a flat surface such as a table or floor).

In an embodiment of the invention, as shown in FIG. 1, one or more magnets 24a, 24b are affixed to the external surface 16 of container 12. Magnets 24a, 24b are used to temporarily attach the shaker bottle 10 to a metallic structure such as a piece of gym equipment. (Note that the description herein refers to different sides or directions with respect to the cylindrical container 12. The side having magnets 24a, 24b affixed to it is referred to as "rear," whereas, the side diametrically opposed thereto is referred to as the "front." The side to the right of the front side, which bridges the rear surface is referred to as the "right" side. The side to the left of the front side, which bridges the rear surface is referred to as the "left" side. Each "side," is approximately a 90° curved perimeter area of external surface 16 of container 12. Each "side" may be interchangeably referred to as a "panel," "surface," "wall," or "sidewall.")

Figure 2:
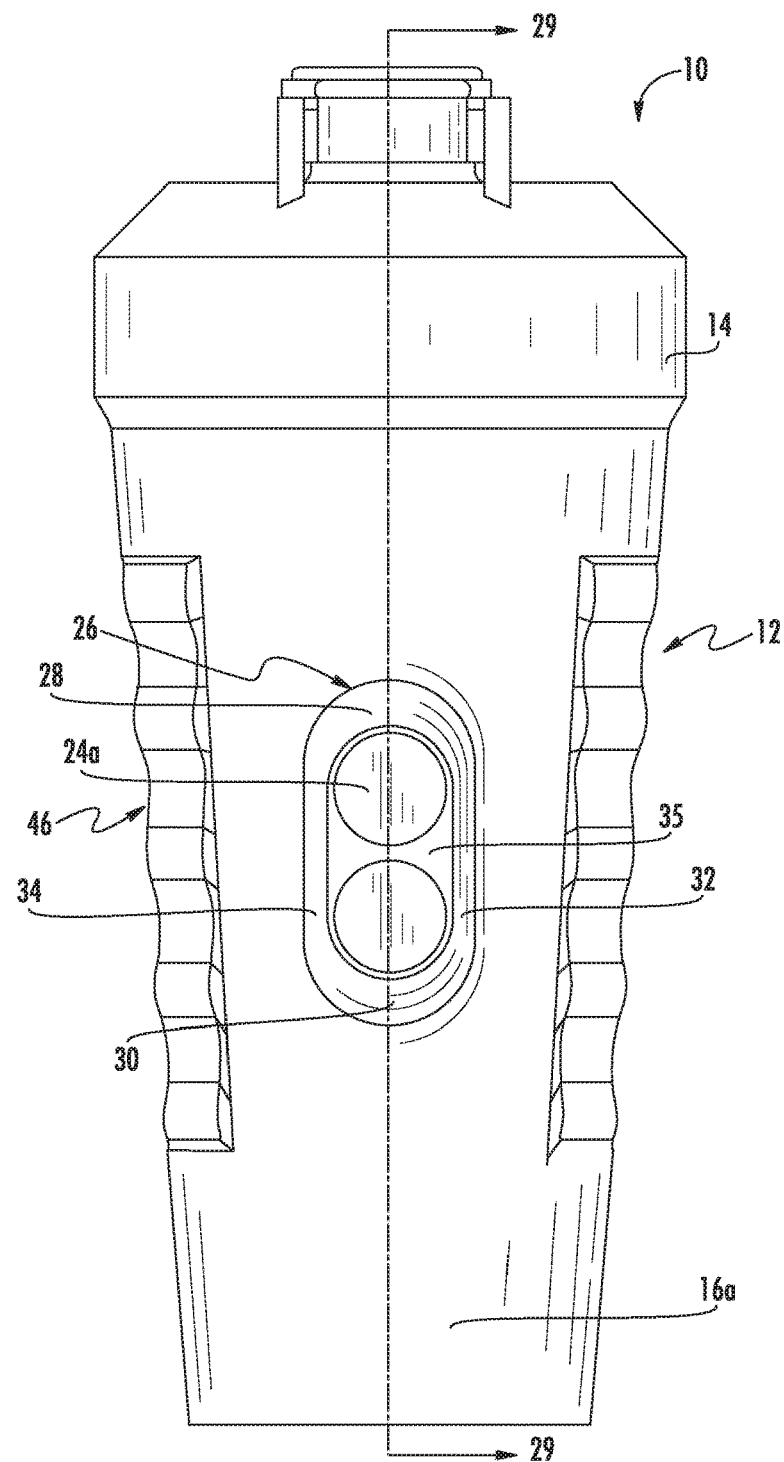
FIG. 2 is a rear, elevational view of a shaker bottle according to an embodiment of the invention.

FIG. 2 is an elevational view of rear panel 16a of container 12. As shown, an attachment appendage 26 projects laterally from the surface thereof.

FIG. 3 is a cross-sectional view of shaker bottle 10 taken through the plane indicated by line 29 in FIG. 2. Rear panel 16a and opposing front panel 16c are shown in cross-section, whereas, the internal wall surface of left-side panel 16b is shown. As shown, attachment appendage 26 projects laterally from the outer surface of rear panel 16a.

Attachment appendage 26 is formed integrally with, or attached to, rear panel 16a of container 12. For example, as shown in FIG. 3, appendage 26 is a projection or similar surface that juts out from rear panel 16a. Appendage has an upper wall 28, a lower wall 30 and sidewalls 32, 34 (sidewalls 32, 34 best shown in FIGS. 1 and 2)—each extending laterally from rear panel 16a. Upper, lower and sidewalls 28, 30, 32, 34 terminate in a platform 35 (see e.g. FIG. 1). Platform 35 is a flat surface disposed substantially orthogonally to walls 28, 30, 32, 34. In a preferred embodiment of the invention, appendage is a blow-molded thickening of a wall area disposed approximately midway between cup lip 20 and lower surface 22 of rear panel 16a.

One or more magnets 24a, 24b are affixed to or positioned in attachment appendage 26. For example, one or more recesses or slots are provided on appendage 26 to correspondingly accommodate one or more magnets. With reference to FIG. 3, an upper slot 36a and a lower slot 36b are shown, which correspondingly accommodate an upper magnet 24a and a lower magnet 24b. In the embodiment shown, slots 36a, 36b are substantially circular recesses made in the thickness of appendage 26. Slots 36a, 36b are substantially sized and shaped to receive disc-shaped magnets 24a, 24b. For example, recess 36a is shown having a floor surface 38 and surrounding walls 40. Each corresponding disc-shaped magnet (e.g. 24a) has a circular front face 42a, a rear face 42b and an annular edge 44 bridging the front and rear faces. Annular edge 44 is substantially orthogonal to front face 42a and rear face 42b—defining the thickness of the magnet 24a.

As shown, rear face 42b of a magnet (e.g. 24a) is inserted in contact with floor surface 38 of a slot (e.g. 36a). In one embodiment, surrounding walls 40 of slot 36a capture annular edge 44 of magnet 24a and maintain the same in place. Slots 36a, 36b have a depth that is substantially equal to the thickness of magnets 24a, 24b (i.e. the depth of surrounding walls 40 of slots 36a, 36b are substantially equal to the thickness of annular edge 44). As such, outward directed front faces 42a (best shown in FIG. 1) of magnets 24a, 24b are substantially coplanar with platform 35 of appendage 26. Magnets 24a, 24b and coplanar platform 35 form a substantially planar contact surface that interfaces with a metallic segment of a piece of exercise equipment.

It will be understood by those of ordinary skill in the art that front faces 42a of magnets 24a, 24b need not be coplanar with platform 35 of appendage 26. In one embodiment of the invention, magnets 24a, 24b extend past platform 35, such that only magnets contact a metallic structure. Still in other embodiments, slots 36a, 36b may have a depth that is slightly greater than the thickness of a magnet, such that one or more magnets are recessed with respect to platform 35.

Magnets 24a, 24b may be glued into a slots or secured therein by way of a tight frictional grip. In either case, in a preferred embodiment of the invention, magnets 24a, 24b are covered or coated in a protective material (such as plastic of the like) to protect the same during washing and cleaning.

As best shown in FIG. 3, in an embodiment of the invention, attachment appendage 26 projects from rear panel 16a of shaker bottle 10 in an offset manner so as to ensure that front faces 42a of magnets 24a, 24b are substantially parallel to a longitudinal axis of the shaker bottle 10 (longitudinal axis indicated by dotted line 41). That is, as stated, rear panel 16a slopes inward (i.e. toward the direction of the longitudinal axis of shaker 10) from cup lip 20 to the lower surface 22 of container 12. In a preferred embodiment, contact surfaces (i.e. front faces 42a) of magnets 24a, 24b occupy a plane that is at an acute angle from panel 16a. Preferably, the plane occupied by contact surfaces of magnets 24a, 24b is substantially parallel to the longitudinal axis of shaker 10. Thus, in an embodiment of the invention, lower wall 30 of appendage 26 extends farther in a lateral direction than upper wall 28 thereof. In this embodiment, the thickness of side walls 32, 34 of appendage 26 gradually increase as they descend from upper wall 28 to lower wall 30.

It will be understood by those of ordinary skill in the art that magnets of any of various sizes and shapes are within the teaching of the invention, and two circular magnets are exemplary.

In a preferred embodiment of the invention, one or more magnets used to attach shaker 10 to a piece of exercise equipment have a longitudinal aspect. That is, in a preferred embodiment, in order to securely affix a shaker bottle 10 to a metallic surface, and to minimize side-to-side movement, two magnets arranged in a longitudinal plane are utilized. In such arrangement there are at least two contact points at which magnetic pulling three is applied (i.e. an upper and a lower contact point). Magnets arranged in a longitudinal plane or arranged where one is situated above of the other may be referred to as magnets having a "longitudinal aspect" herein. As a result of the longitudinal aspect, pulling force is applied in an upper region and a lower region.

For example, as shown in FIGS. 1-5, in one embodiment of the invention, a first upper magnet 24a is positioned above of a second lower magnet 24b ("upper" refers to the direction toward cover 14, whereas, "lower" refers to the direction toward lower surface 22 of container 12). Upper magnet 24a applies pulling force in an upper region, whereas, lower magnet 24b applies pulling force in a longitudinal region below thereof. In other embodiments of the invention, more or less than two magnets may be used. For example, three or more magnets may be provided substantially in a straight line. Alternatively, three magnets in "triangle" formation (e.g. two upper magnets and one lower magnet—or vice versa) may be provided. Alternatively, a single elongated magnet having a longitudinal aspect may be used. Still, in other embodiments of the invention, two parallel strips or groups of magnets, where each of the strips or groups have a longitudinal aspect may be used in embodiments of the invention.

In a preferred embodiment, attachment appendage 26 is positioned on rear panel 16a, substantially halfway between cup lip 20 and lower surface 22. It will be understood, however, that alternative placements of appendage 26 are possible—all of which are within the teaching of the invention.

In use, a user aligns magnets 24a, 24b with a metallic or ferric structure, and then places the magnets in contact therewith. The shaker cup 10 will, thus, adhere to the structure by magnetic attraction generated by one or more magnets on its outer surface. For example, bottle 10 may be attached to any of various arms, support bars or similar structures on exercise machines in a gym. This allows a user to simply approach a piece of equipment, easily attach the shaker thereto and proceed to exercise without worrying that the shaker may be a tripping hazard or in somebody's way. It will be understood by those of ordinary skill in the art that one or more magnets mounted to the shaker 10 will exert (or combine to exert) magnetic attraction of sufficient force to securely, yet temporarily, adhere a shaker bottle that is full of fluid to a metallic or ferric structure.

In one embodiment of the invention, each magnet 24a, 24b exerts between 2-8 pounds of pulling force. In other embodiments, each magnet exerts between 3-6 pounds of pulling force, yet other embodiments, a single magnet having a longitudinal aspect exerts between 5-12 pounds of pulling force. It will be understood that the pulling force ranges are exemplary and forces that are more or less than the recited ranges are possible in different embodiments f the invention. Note that where a numerical range is provided herein for any parameter, it is understood that all numerical subsets of that numerical range, and all the individual integer values contained therein, are provided as part of the invention.

In a preferred embodiment, a series of indentations, flutes or similar grooves 46 are made in the exterior surface of container 12. Grooves 46, which are roughly sized and shaped to receive average-sized fingers are provided on the side panels (e.g. left side panel 16b and diametrically opposed right panel) of the container 12. In a preferred embodiment, a series of substantially parallel grooves 46 span at least a portion of the side panels of the shaker 10. Grooves 46 are substantially parallel to the bottom surface 22 of shaker, and in an embodiment, at least one or more grooves are positioned at the same height as appendage 26 or a segment thereof. In one embodiment, grooves 46 extend somewhat into rear panel 16a. For example, FIG. 2 shows a series of grooves 46 terminating on rear panel 16a. As such, when the shaker 10 is secured to a ferric element with its rear panel 16a magnetically adhered thereto—a user approaching from the front of the shaker may grip the bottle by inserting his/her fingers into grooves 46 and pulling the shaker 10 off (thereby releasing the magnetic grip).

In a preferred embodiment of the invention, shaker 10 is configured such that when cover 14 is fastened thereto, the spout 48 substantially aligns with front panel 16c and is diametrically opposed from rear panel 16a. In one embodiment, respective threads on the container 12 and cover 14 are positioned in a manner such that when cover is rotated to attach to container 12—rotation terminates when spout 48 is substantially in line with the front panel 16c of shaker 10. As such, when a user pulls shaker 10 off of a piece of equipment, it will be positioned in his/her hand with spout 48 in the proper orientation for drinking.

Figure 4:
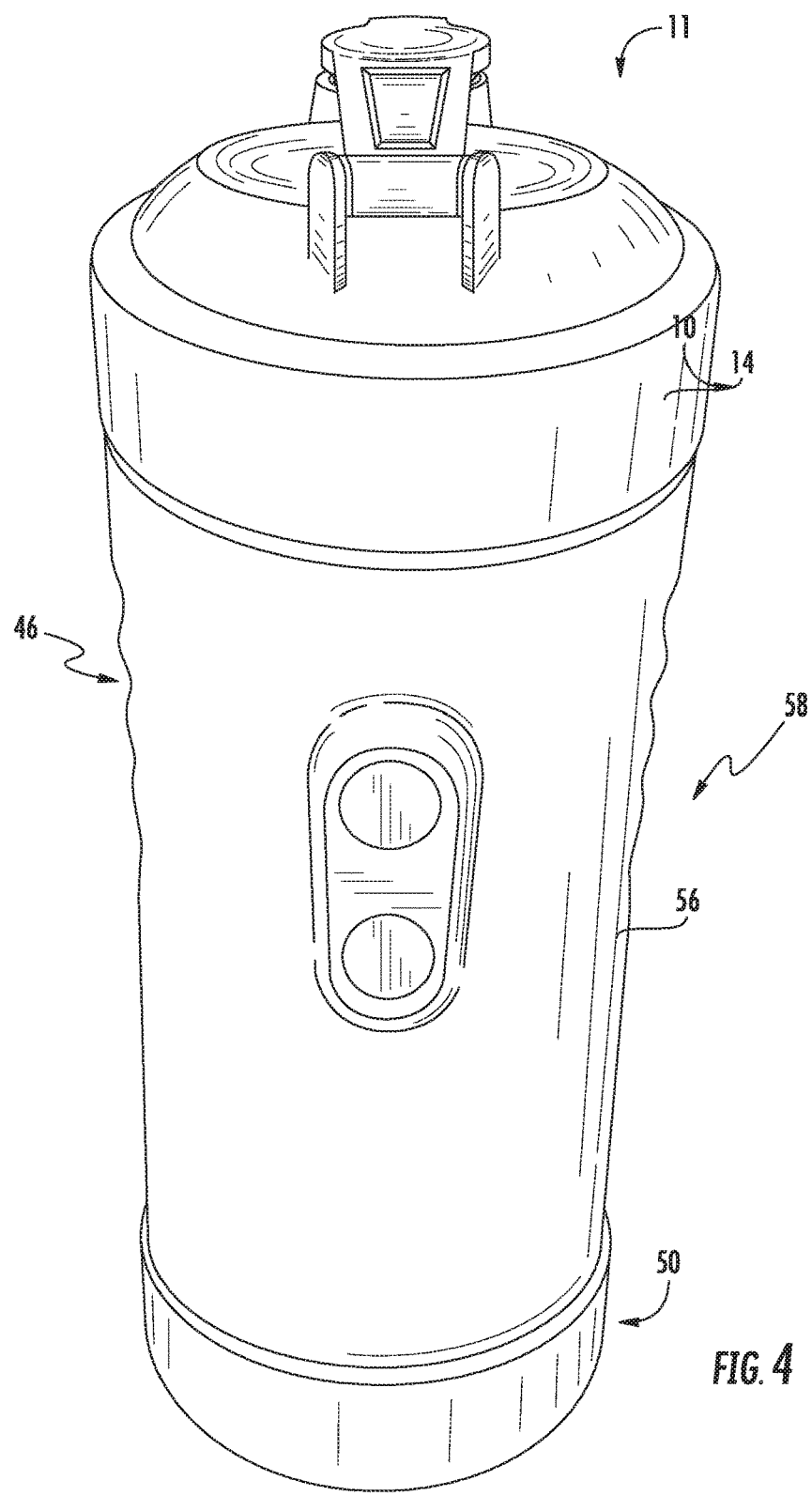
FIG. 4 a rear, perspective view of a shaker bottle having a removable bottom cap according to an embodiment of the invention.
Figure 5:
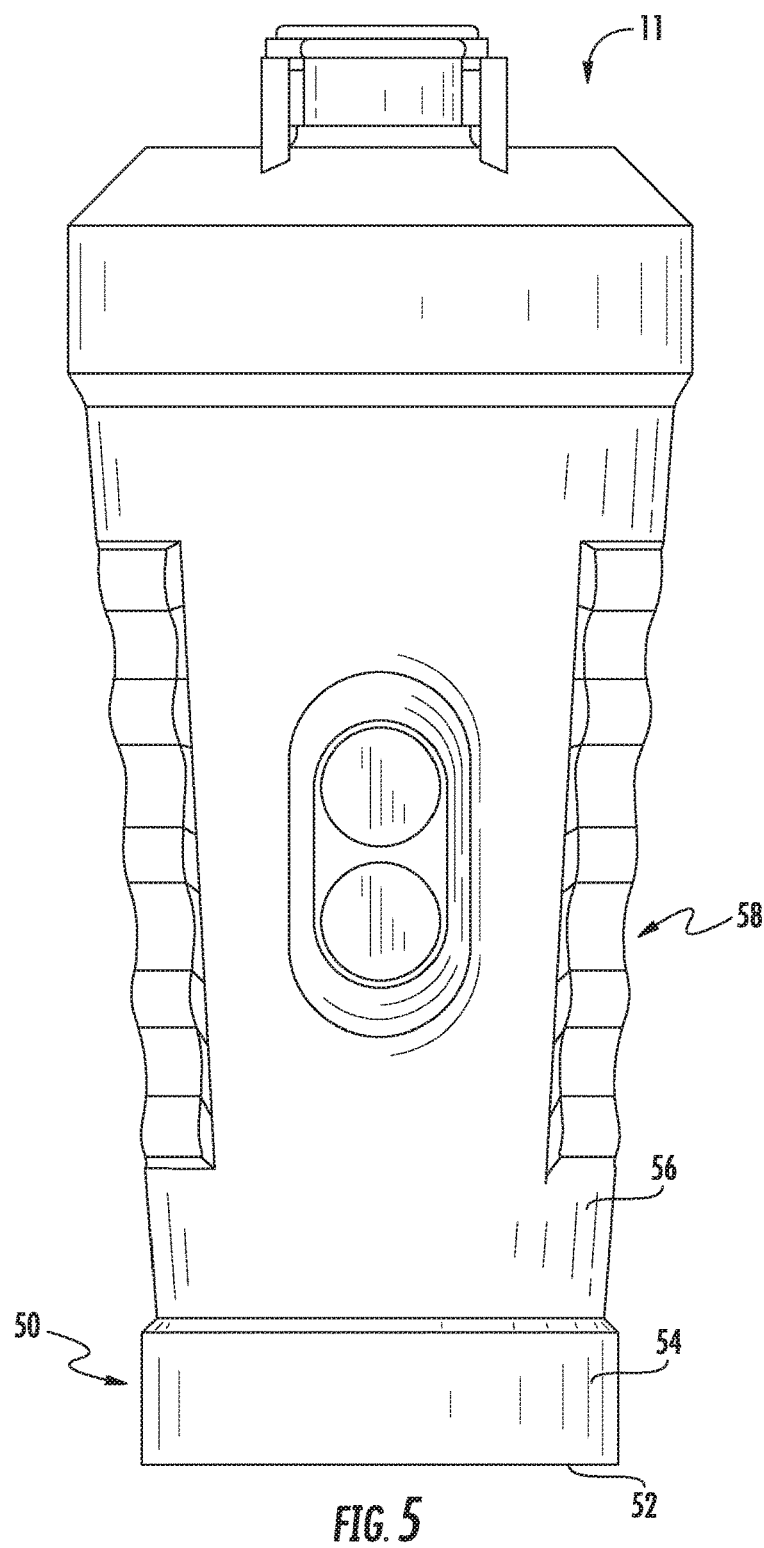
FIG. 5 is a elevational view of the shaker bottle according of FIG. 4.

With reference to FIGS. 4 and 5, in one embodiment of the invention, a removable bottom cap 50 is provided as a bottom surface of the shaker 11. In this embodiment, container 58 is formed of a cylindrical body segment 56 and a bottom cap 50. Bottom cap 50 is a substantially disc-shaped cap that has a floor or bottom surface 52 and surrounding walls 54. A series of threads on the inside surface of surrounding walls 54 (not shown) mate with corresponding threads on the bottom of the cylindrical body 56 segment. Cap 50 is thereby attachable to the bottom of the cylindrical body 56 (e.g. by rotation of one with respect to the other)— forming the bottom or floor thereof. As such, a user may simply unscrew cap 50 in order to adequately clean the inside bottom of the bottle. It will be understood by those of ordinary skill in the art that any of various attachment mechanisms may be utilized to attach a bottom cap, such as a tight frictional engagement or the like.

In the embodiments shown in FIGS. 1-3 and 4-5, the bottom segment of the container is sized and shaped to fit into a standard cup-holder in vehicles such as cars.

Having described this invention with regard to specific embodiments, it is to be understood that the description is not meant as a limitation since further modifications and variations may be apparent or may suggest themselves to those skilled in the art. It is intended that the present application cover all such modifications and variations. That is, although described with respect to specific embodiments, the invention relates to any of various shaker bottle configurations that magnetically adhere to a metallic structure.

What is claimed is:

1. A bottle, comprising:
a container portion comprising:
an upper lip;
a floor surface;
a sidewall that longitudinally connects the upper lip to the floor surface, the sidewall sloping inwardly from the upper lip to the floor surface;
a projection portion extending from the sidewall, the projection portion comprising:
a top wall extending laterally from the sidewall at a first distance from the upper lip, and a bottom wall extending laterally from the sidewall at a second distance from the floor surface, wherein the bottom wall extends farther in a lateral direction than the top wall, the top and bottom walls of the projection portion terminate in a substantially flat platform;
the flat platform being at an angle to the sidewall and substantially parallel to a longitudinal axis of the bottle; and
one or more magnets disposed on the platform, wherein the one or more magnets include a front face which is substantially parallel to the longitudinal axis of the bottle.

2. The bottle of claim 1, further comprising one or more slots in the platform that receives the one or more magnets.

3. The bottle of claim 2, wherein the one or more slots is one or more recessed areas.

4. The bottle of claim 2, further comprising two slots and a magnet seated in each slot.

5. The bottle of claim 1, wherein the one or more magnets are disc-shaped.

6. The bottle of claim 1, comprising at least a first upper magnet and a second lower magnet.

7. The bottle of claim 6, wherein the first upper magnet is disposed substantially directly above the second lower magnet when the bottle is in an upright position.

8. The bottle of claim 1, wherein the one or more magnets and the flat platform are substantially coplanar.

9. The bottle of claim 1, wherein the sidewall that connect the upper lip to the floor surface slopes as it descend from the upper lip to the floor surface.

10. The bottle of claim 1, wherein the flat platform of the projection portion is substantially parallel to a longitudinal axis of the bottle.

11. The bottle of claim 1, further comprising a series of grooves provided on the sidewall.

12. The bottle of claim 11, wherein the series of grooves is oriented substantially parallel to the floor surface of the container portion.

13. The bottle of claim 11, further comprising a cover that has a spout, and wherein the spout is substantially aligned with a portion of the sidewall.

14. The bottle of claim 1, wherein the projection portion is positioned substantially halfway between the upper lip and the floor surface.

* * * * *